United States Patent
Sun et al.

(10) Patent No.: US 9,808,974 B2
(45) Date of Patent: *Nov. 7, 2017

(54) METHOD OF PREPARING ALUMINUM ALLOY RESIN COMPOSITE AND ALUMINUM ALLOY-RESIN COMPOSITE OBTAINABLE BY THE SAME

(71) Applicants: BYD COMPANY LIMITED, Shenzhen, Guangdong (CN); SHENZHEN BYD AUTO R&D COMPANY LIMITED, Shenzhen, Guangdong (CN)

(72) Inventors: Jian Sun, Guangdong (CN); Yanqing Wu, Guangdong (CN); Yunxia Zhang, Guangdong (CN)

(73) Assignees: SHENZHEN BYD AUTO R&D COMPANY LIMITED, Shenzhen (CN); BYD COMPANY LIMITED, Shenzhen (CN)

( * ) Notice: Subject to any disclaimer, the term of this patent is extended or adjusted under 35 U.S.C. 154(b) by 367 days.

This patent is subject to a terminal disclaimer.

(21) Appl. No.: 14/466,873

(22) Filed: Aug. 22, 2014

(65) Prior Publication Data

US 2014/0360974 A1 Dec. 11, 2014

Related U.S. Application Data

(63) Continuation of application No. PCT/CN2012/082036, filed on Sep. 26, 2012.

(30) Foreign Application Priority Data

Feb. 24, 2012 (CN) .......................... 2012 1 0043639

(51) Int. Cl.
| | |
|---|---|
| B32B 5/18 | (2006.01) |
| B29C 45/14 | (2006.01) |
| B32B 15/08 | (2006.01) |
| C25D 11/18 | (2006.01) |
| C25D 11/24 | (2006.01) |
| B32B 7/02 | (2006.01) |
| B32B 15/20 | (2006.01) |
| B32B 27/20 | (2006.01) |
| B32B 27/32 | (2006.01) |
| B32B 27/34 | (2006.01) |
| C25D 11/04 | (2006.01) |

(Continued)

(52) U.S. Cl.
CPC .. *B29C 45/14795* (2013.01); *B29C 45/14311* (2013.01); *B32B 7/02* (2013.01); *B32B 15/08* (2013.01); *B32B 15/20* (2013.01); *B32B 27/20* (2013.01); *B32B 27/32* (2013.01); *B32B 27/34* (2013.01); *C25D 11/04* (2013.01); *C25D 11/18* (2013.01); *C25D 11/24* (2013.01); *B29C 2045/14803* (2013.01); *B29C 2045/14868* (2013.01); *B29K 2069/00* (2013.01); *B29K 2071/12* (2013.01); *B29K 2081/04* (2013.01); *B29K 2105/0005* (2013.01); *B29K 2105/0088* (2013.01); *B29K 2309/08* (2013.01); *B29K 2705/02* (2013.01); *B29K 2715/003* (2013.01); *B29L 2009/003* (2013.01); *B32B 2262/0261* (2013.01); *B32B 2262/101* (2013.01); *B32B 2262/106* (2013.01); *B32B 2264/102* (2013.01); *B32B 2264/104* (2013.01); *B32B 2264/105* (2013.01); *B32B 2307/54* (2013.01); *B32B 2307/542* (2013.01); *B32B 2509/00* (2013.01); *B32B 2605/00* (2013.01)

(58) Field of Classification Search
None
See application file for complete search history.

(56) References Cited

U.S. PATENT DOCUMENTS

| | | | |
|---|---|---|---|
| 4,154,705 | A | 5/1979 | Baldi |
| 4,499,237 | A | 2/1985 | Tracke |

(Continued)

FOREIGN PATENT DOCUMENTS

| | | | |
|---|---|---|---|
| CN | 1190062 A | | 8/1998 |
| CN | 1492804 A | | 4/2004 |

(Continued)

OTHER PUBLICATIONS

Database CA [Online] Chemical Abstracts Service, Jan. 26, 2006, Taisei Plas Co., Ltd., Japan: Composite Materials of Anodized Aluminum Alloys and Thermoplastic Resins, and Their Manufacture by Injection Molding, and Abstract for JP 2006-001216, Jan. 5, 2006 (3 pages).

(Continued)

*Primary Examiner* — Shamim Ahmed (57) ABSTRACT

A method of making an aluminum alloy-resin composite and an aluminum alloy-resin composite obtained by the same are provided. The method may comprise: S1: anodizing a surface of an aluminum alloy substrate to form an oxide layer on the surface, in which the oxide layer includes nanopores; S2: immersing the resulting aluminum alloy substrate obtained at step S1 in an alkaline solution having a pH of about 10 to about 13, to form corrosion pores on an outer surface of the oxide layer, wherein the alkaline solution is an aqueous solution including at least one selected from a soluble carbonates, a soluble alkali, a soluble phosphate, a soluble sulfate, and a soluble borate; S3: injection molding a resin onto the surface of the resulting aluminum alloy substrate in step S2 in a mold to obtain the aluminum alloy-resin composite.

20 Claims, 2 Drawing Sheets

(51) Int. Cl.
  *B29K 69/00* (2006.01)
  *B29K 71/00* (2006.01)
  *B29K 81/00* (2006.01)
  *B29K 105/00* (2006.01)
  *B29K 309/08* (2006.01)
  *B29K 705/02* (2006.01)
  *B29L 9/00* (2006.01)

(56) References Cited

U.S. PATENT DOCUMENTS

| | | | |
|---|---|---|---|
| 4,687,551 A * | 8/1987 | Furneaux | B01D 67/0065 |
| | | | 205/50 |
| 5,021,504 A | 6/1991 | Fujita | |
| 5,332,780 A | 7/1994 | Kitazawa et al. | |
| 5,602,200 A | 2/1997 | Wissmann | |
| 5,951,747 A | 9/1999 | Lewis | |
| 6,495,225 B1 | 12/2002 | Nakajima et al. | |
| 6,804,081 B2 | 10/2004 | Den et al. | |
| 7,841,577 B2 | 11/2010 | Yamaguchi et al. | |
| 7,879,734 B2 | 2/2011 | Fukutani et al. | |
| 8,703,272 B2 * | 4/2014 | Naritomi | B29C 45/14311 |
| | | | 264/264 |
| 2001/0036559 A1 | 11/2001 | Haack et al. | |
| 2002/0033108 A1 | 3/2002 | Akiyama et al. | |
| 2002/0040888 A1 * | 4/2002 | Marczak | C23G 1/22 |
| | | | 216/103 |
| 2003/0001274 A1 | 1/2003 | Den et al. | |
| 2003/0180555 A1 | 9/2003 | Wakayama et al. | |
| 2004/0013931 A1 | 1/2004 | Takamura et al. | |
| 2004/0062943 A1 * | 4/2004 | Naritomi | B29C 45/14311 |
| | | | 428/545 |
| 2004/0142503 A1 | 7/2004 | Lee et al. | |
| 2004/0229031 A1 | 11/2004 | Gell et al. | |
| 2006/0046602 A1 * | 3/2006 | Kang | B82Y 10/00 |
| | | | 445/50 |
| 2006/0054589 A1 * | 3/2006 | Omori | B32B 15/08 |
| | | | 216/13 |
| 2006/0055084 A1 | 3/2006 | Yamaguchi et al. | |
| 2006/0057492 A1 | 3/2006 | Kunita | |
| 2006/0088680 A1 | 4/2006 | Kitahara | |
| 2006/0127684 A1 | 6/2006 | Naritomi et al. | |
| 2006/0257624 A1 | 11/2006 | Naritomi et al. | |
| 2007/0096359 A1 | 5/2007 | Torfs | |
| 2007/0116934 A1 * | 5/2007 | Miller | C25D 1/10 |
| | | | 428/172 |
| 2007/0196637 A1 | 8/2007 | Good et al. | |
| 2008/0041257 A1 | 2/2008 | Teng | |
| 2008/0057336 A1 | 3/2008 | Kurokawa et al. | |
| 2008/0070152 A1 | 3/2008 | Yu | |
| 2008/0081867 A1 | 4/2008 | Sakata et al. | |
| 2008/0102404 A1 | 5/2008 | Tashiro et al. | |
| 2009/0017242 A1 | 1/2009 | Weber et al. | |
| 2009/0075156 A1 | 3/2009 | Long et al. | |
| 2009/0155522 A1 | 6/2009 | Raghavendran | |
| 2009/0202840 A1 | 8/2009 | Griebel et al. | |
| 2009/0274889 A1 | 11/2009 | Iwahashi et al. | |
| 2009/0280296 A1 | 11/2009 | Naritomi et al. | |
| 2009/0304970 A1 * | 12/2009 | Imaizumi | B29C 45/062 |
| | | | 428/38 |
| 2010/0018025 A1 | 1/2010 | Naritomi et al. | |
| 2010/0021718 A1 | 1/2010 | Vos et al. | |
| 2010/0028602 A1 | 2/2010 | Naritomi et al. | |
| 2010/0177392 A1 | 7/2010 | Masuda et al. | |
| 2010/0189958 A1 | 7/2010 | Naritomi et al. | |
| 2010/0190029 A1 | 7/2010 | Ueki | |
| 2010/0215965 A1 | 8/2010 | Tadaki | |
| 2010/0218827 A1 | 9/2010 | Aono et al. | |
| 2010/0255732 A1 | 10/2010 | Kohmura et al. | |
| 2010/0283165 A1 | 11/2010 | Ihara | |
| 2010/0304083 A1 | 12/2010 | Naritomi et al. | |
| 2010/0316878 A1 | 12/2010 | Naritomi et al. | |
| 2010/0319757 A1 | 12/2010 | Oetting | |
| 2011/0008644 A1 | 1/2011 | Naritomi et al. | |
| 2011/0111214 A1 | 5/2011 | Endo et al. | |
| 2011/0165342 A1 * | 7/2011 | Imai | B29C 45/14311 |
| | | | 427/535 |
| 2011/0250377 A1 | 10/2011 | Qin | |
| 2011/0281135 A1 * | 11/2011 | Gong | B01J 23/80 |
| | | | 428/626 |
| 2011/0297549 A1 * | 12/2011 | Chen | B29C 45/14311 |
| | | | 205/50 |
| 2011/0300400 A1 | 12/2011 | Tomita | |
| 2011/0305893 A1 * | 12/2011 | Chang | B29C 45/14311 |
| | | | 428/322.7 |
| 2011/0318585 A1 | 12/2011 | Su et al. | |
| 2012/0015186 A1 | 1/2012 | Honma et al. | |
| 2012/0039066 A1 | 2/2012 | Hatanaka et al. | |
| 2012/0043689 A1 | 2/2012 | Chang et al. | |
| 2012/0094108 A1 | 4/2012 | Chang et al. | |
| 2012/0168990 A1 | 7/2012 | Kuwahara et al. | |
| 2012/0213971 A1 | 8/2012 | Ihara | |
| 2012/0237755 A1 | 9/2012 | Chang et al. | |
| 2013/0043689 A1 | 2/2013 | Tai et al. | |
| 2013/0052582 A1 * | 2/2013 | Hayashi | B41N 3/034 |
| | | | 430/270.1 |
| 2013/0078423 A1 | 3/2013 | Sutou et al. | |
| 2013/0242487 A1 | 9/2013 | Fujioka et al. | |
| 2014/0363623 A1 | 12/2014 | Sun et al. | |
| 2014/0363631 A1 | 12/2014 | Gong et al. | |
| 2014/0363657 A1 | 12/2014 | Gong et al. | |
| 2014/0363658 A1 | 12/2014 | Sun et al. | |
| 2014/0363659 A1 | 12/2014 | Sun et al. | |
| 2014/0363660 A1 | 12/2014 | Gong et al. | |
| 2014/0363686 A1 | 12/2014 | Sun et al. | |

FOREIGN PATENT DOCUMENTS

| | | |
|---|---|---|
| CN | 1639387 A | 7/2005 |
| CN | 1706992 A | 12/2005 |
| CN | 1711170 A | 12/2005 |
| CN | 1717323 A | 1/2006 |
| CN | 101010452 A | 8/2007 |
| CN | 101248219 A | 8/2008 |
| CN | 101313087 A | 11/2008 |
| CN | 101341023 A | 1/2009 |
| CN | 101396888 A | 4/2009 |
| CN | 101409229 A | 4/2009 |
| CN | 101547779 A | 9/2009 |
| CN | 101568420 A | 10/2009 |
| CN | 101578170 A | 11/2009 |
| CN | 101607446 A | 12/2009 |
| CN | 101623933 A | 1/2010 |
| CN | 101640169 A | 2/2010 |
| CN | 101687390 A | 3/2010 |
| CN | 101743111 A | 6/2010 |
| CN | 101795845 A | 8/2010 |
| CN | 101802263 A | 8/2010 |
| CN | 101875251 A | 11/2010 |
| CN | 101913065 A | 12/2010 |
| CN | 101937935 A | 1/2011 |
| CN | 101941271 A | 1/2011 |
| CN | 101988609 A | 3/2011 |
| CN | 102021569 A | 4/2011 |
| CN | 102039700 A | 5/2011 |
| CN | 102056724 A | 5/2011 |
| CN | 102229266 A | 11/2011 |
| CN | 102234803 A | 11/2011 |
| CN | 102268183 A | 12/2011 |
| CN | 102345127 A | 2/2012 |
| CN | 102371679 A | 3/2012 |
| CN | 102441962 A | 5/2012 |
| CN | 102442028 A | 5/2012 |
| CN | 102666921 A | 9/2012 |
| CN | 102776466 A | 11/2012 |
| CN | 103036086 A | 4/2013 |
| EP | 1643546 A2 | 4/2006 |
| EP | 1958763 A1 | 8/2008 |
| EP | 2031099 A1 | 3/2009 |
| EP | 2154203 A1 | 2/2010 |
| EP | 2221398 A1 | 8/2010 |
| EP | 2426237 A1 | 3/2012 |
| JP | S50-39759 A | 4/1975 |

(56) References Cited

FOREIGN PATENT DOCUMENTS

| | | |
|---|---|---|
| JP | S59211576 A | 11/1984 |
| JP | 61-106796 A | 5/1986 |
| JP | H06272085 A | 9/1994 |
| JP | 2000144491 A | 5/2000 |
| JP | 2001254009 A | 9/2001 |
| JP | 2001315159 A | 11/2001 |
| JP | 2002225164 A | 8/2002 |
| JP | 2004-055248 A | 2/2004 |
| JP | 2004249681 A | 9/2004 |
| JP | 2005-342895 A | 12/2005 |
| JP | 2006-001216 A | 1/2006 |
| JP | 2006027018 A | 2/2006 |
| JP | 2007-016123 | 1/2007 |
| JP | 2007050630 A | 3/2007 |
| JP | 2007203585 A | 8/2007 |
| JP | 2008091933 A | 4/2008 |
| JP | 2008095132 A | 4/2008 |
| JP | 2006124827 A | 5/2008 |
| JP | 2008138288 A | 6/2008 |
| JP | 2008156381 A | 7/2008 |
| JP | 2008243412 A | 10/2008 |
| JP | 2009041008 A | 2/2009 |
| JP | 2009267334 A | 11/2009 |
| JP | 2010-000679 A | 1/2010 |
| JP | 2010030177 A | 2/2010 |
| JP | 2010-064496 A | 3/2010 |
| JP | 2010110931 A | 5/2010 |
| JP | 2011021260 A | 2/2011 |
| JP | 2011168017 A | 9/2011 |
| JP | 2011174133 A | 9/2011 |
| JP | 2011194594 A | 10/2011 |
| JP | 2011218603 A | 11/2011 |
| JP | 2012006392 A | 1/2012 |
| JP | 2012193448 A | 10/2012 |
| KR | 20060104540 A | 10/2006 |
| KR | 20080062814 A | 7/2008 |
| KR | 20090027317 A | 3/2009 |
| KR | 20090089852 A | 8/2009 |
| WO | WO 01/38444 A1 | 5/2001 |
| WO | WO 2004/048087 A1 | 6/2004 |
| WO | 2005109984 A2 | 11/2005 |
| WO | 2007066742 A1 | 6/2007 |
| WO | WO 2009/078377 A1 | 6/2009 |
| WO | WO 2010/073636 A1 | 7/2010 |
| WO | WO 2011/055757 A1 | 5/2011 |
| WO | WO 2011/071102 A1 | 6/2011 |
| WO | WO 2011/123790 A1 | 10/2011 |
| WO | WO 2013/123754 A1 | 8/2013 |
| WO | WO 2013/123756 A1 | 8/2013 |
| WO | WO 2013/123769 A1 | 8/2013 |
| WO | WO 2013/123770 A1 | 8/2013 |
| WO | WO 2013/123771 A1 | 8/2013 |
| WO | WO 2013/123772 A1 | 8/2013 |
| WO | WO 2013/123773 A1 | 8/2013 |
| WO | WO 2013/123898 A1 | 8/2013 |
| WO | 2013148476 A1 | 10/2013 |
| WO | 2013178057 A1 | 12/2013 |
| WO | 2014101778 A1 | 7/2014 |

OTHER PUBLICATIONS

Furneaux et al., "The Formation of Controlled-porosity Membranes from Anodically Oxidized Aluminum," Nature, vol. 337, No. 6203, Jan. 12, 1989, pp. 147149.
Gong et al., "Electrochemical/chemical Synthesis of Nanostructured Arrays of Oxide Cones or Rings," Journal of Materials Chemistry. vol. 18, No. 15, Mar. 12, 2008, pp. 1741-1746.
Lee et al., "NanostructureDependent WaterDroplet Adhesiveness Change in Superhydrophobic Anodic Aluminum Oxide Surfaces: From Highly Adhesive to Self-Cleanable," Langmuir Letter, vol. 26, No. 3, Feb. 2, 2010, pp. 1412-1415, including Supporting Information, Dec. 29, 2009.
Extended European Search Report dated Sep. 25, 2015, issued in related European Patent Application No. EP 12869418.9 (7 pages).
Extended European Search Report dated Sep. 25, 2015, issued in related European Patent Application No. EP12869214.2 (6 pages).
PCT International Preliminary Report on Patentability dated Aug. 26, 2014, issued in related International Application No. PCT/CN2012/078830 (5 pages).
PCT International Preliminary Report on Patentability dated Aug. 26, 2014, issued in related International Application No. PCT/CN2012/078832 (5 pages).
PCT International Preliminary Report on Patentability dated Aug. 26, 2014, issued in related International Application No. PCT/CN2012/082025 (5 pages).
PCT International Preliminary Report on Patentability dated Aug. 26, 2014, issued in related International Application No. PCT/CN2012/082029 (5 pages).
PCT International Preliminary Report on Patentability dated Aug. 26, 2014, issued in related International Application No. PCT/CN2012/082043 (5 pages).
PCT International Preliminary Report on Patentability dated Aug. 26, 2014, issued in related International Application No. PCT/CN2013/071797 (7 pages).
PCT International Preliminary Report on Patentability dated Aug. 26, 2014. issued in related International Application No. PCT/CN2012/082031 (5 pages}.
PCT International Search Report and Written Opinion dated Mar. 27, 2014, issued in related International Application No. PCT/CN2013/090471 (13 pages).
PCT International Search Report and Written Opinion dated Sep. 5, 2013, issued in related International Application No. PCT/CN2013/076351 (12 pages).
Non-Final Office Action dated May 24, 2016, issued in related U.S. Appl. No. 14/466,906 (11 pages).
Non-Final Office Action dated Feb. 18, 2016, issued in related U.S. Appl. No. 14/466,927 (15 pages).
Non-Final Office Action dated Apr. 8, 2016, issued in related U.S. Appl. No. 14/466,932 (9 pages).
Final Office Action dated Jun. 20, 2016, issued in related U.S. Appl. No. 14/466,932 (10 pages).
PCT International Search Report dated Nov. 29, 2012, issued in International Application No. PCT/CN2012/078830 (4 pages).
PCT International Search Report dated Dec. 13, 2012, issued in International Application No. PCT/CN2012/078832 (4 pages).
PCT International Search Report dated Jan. 3, 2013, issued in International Application No. PCT/CN2012/082025 (4 pages).
PCT International Search Report dated Jan. 3, 2013, issued in International Application No. PCT/CN2012/082029 (4 pages).
PCT International Search Report dated Jan. 3, 2013, issued in International Application No. PCT/CN2012/082031 (4 pages).
PCT International Search Report dated Jan. 10, 2013, issued in International Application No. PCT/CN2012/082043 (4 pages).
PCT International Search Report dated May 30, 2013, issued in International Application No. PCT/CN2013/071797 (4 pages).
PCT International Search Report dated Jan. 3, 2013, issued in International Application No. PCT/CN2012/082036 (4 pages).
Non-Final Office Action dated Aug. 1, 2016, issued in related U.S. Appl. No. 14/466,920 (12 pages).
Final Office Action dated Jul. 21, 2016, issued in related U.S. Appl. No. 14/466,927 (13 pages).
Non-Final Office Action dated Sep. 20, 2016, issued in related U.S. Appl. No. 14/466,932 (17 pages).
Non-Final Office Action dated Aug. 3, 2016, issued in related U.S. Appl. No. 14/466,937 (14 pages).
Non-Final Office Action for U.S. Appl. No. 14/466,853, dated Sep. 30, 2016 (12 pages).
Non-Final Office Action for U.S. Appl. No. 14/466,363, dated Oct. 18, 2016 (12 pages).
Final Office Action for U.S. Appl. No. 14/466,906, dated Nov. 9, 2016, 36 pages.
Final Office Action for U.S. Appl. No. 14/466,932, dated Jan. 20, 2017, 15 pages.
Non-Final Office Action for U.S. Appl. No. 14/554,370, dated Feb. 2, 2017, 46 pages.
Final Office Action for U.S. Appl. No. 14/466,920, dated Feb. 16, 2017, 18 pages.

(56) References Cited

OTHER PUBLICATIONS

Final Office Action for U.S. Appl. No. 14/466,937, dated Feb. 17, 2017, 17 pages.
Non-Final Office Action for U.S. Appl. No. 14/466,927, dated Feb. 21, 2017, 37 pages.
Final Office Action for U.S. Appl. No. 14/466,853, dated Mar. 13, 2017, 18 pages.
Final Office Action for U.S. Appl. No. 14/466,363, dated Mar. 29, 2017, 18 pages.
Non-Final Office Action for U.S. Appl. No. 14/466,932, dated Apr. 28, 2017, 25 pages.
Non-Final Office Action for U.S. Appl. No. 14/723,344, dated Jun. 8, 2017, 44 pages.

* cited by examiner

METHOD OF PREPARING ALUMINUM ALLOY RESIN COMPOSITE AND ALUMINUM ALLOY-RESIN COMPOSITE OBTAINABLE BY THE SAME

CROSS-REFERENCE TO RELATED APPLICATION

This application is a continuation of International Patent Application No. PCT/CN2012/082036, filed Sep. 26, 2012, which claims priority to and benefits of Chinese Patent Application Serial No. 201210043639.9, filed with the State Intellectual Property Office of P. R. China on Feb. 24, 2012. The entire content of the above applications is incorporated herein by reference.

FIELD

The present disclosure relates to the field of metal-plastic molding, and more particularly to a method of preparing aluminum alloy-resin composite and an aluminum alloy-resin composite obtained by the same.

BACKGROUND

In manufacturing articles, such as automobiles, household appliances and industrial machines, a metal and a resin often need to be firmly bonded together. In conventional methods, an adhesive may be used at normal temperature or under heating to integrally bond a metal and a synthetic resin. Alternatively, a resin may be bonded to a magnesium alloy, an aluminum alloy, or ferroalloys such as stainless steel directly without an adhesive.

Nano molding technology (NMT) is a technique of integrally bonding a metal and a resin, and allows the resin to be directly injection molded on a surface of a metal sheet by nano molding the surface of the metal sheet so as to obtain a metal-resin integrally molded product. For effective bonding of a metal and a resin, NMT may replace commonly used insert molding or zinc-aluminum or magnesium-aluminum die casting so as to provide a metal-resin integrally molded product with low cost and high performance. Compared with other bonding technologies, NMT may reduce the weight of the final product, may ensure excellent strength of the mechanical structure, high processing rate, high output, and allows more appearance decoration methods, consequently applicable to vehicles, IT equipment, and 3C products.

SUMMARY

Embodiments of the present disclosure seek to solve at least one of the problems existing in the prior art, particularly technical problems caused by weak combination force between the aluminum alloy and the resin in conventional aluminum alloy-resin composites. And the present disclosure aims to provide a method of preparing an aluminum alloy-resin composite with strong combination force between the aluminum alloy and the resin, thereby facilitating massive production and reducing pollution.

According to a first aspect of the present disclosure, there is provided a method of preparing an aluminum alloy-resin composite, comprising:

S1: anodizing a surface of an aluminum alloy substrate to form an oxide layer on the surface, in which the oxide layer is formed with nanopores;

S2: immersing the resulting aluminum alloy substrate generated at step S1 in an alkaline solution having a pH of about 10 to about 13, to form corrosion pores in an outer surface of the oxide layer. The alkaline solution includes an aqueous solution comprising at least one selected from a soluble carbonates, a soluble alkali, a soluble phosphate, a soluble sulfate, and a soluble borate; and S3: injection molding a resin onto the surface of the resulting aluminum alloy substrate generated at step S2 in a mold to obtain the aluminum alloy-resin composite.

According to a second aspect of the present disclosure, there is provided an aluminum alloy-resin composite, obtained by the method according to the first aspect of the present disclosure.

A unique two-layer spatial pore structure may be formed on the surface of an aluminum alloy, by means of the method according to embodiments of the present disclosure. An aluminum oxide layer may be formed on the surface of the aluminum alloy, and the aluminum oxide layer includes nanopores with desired properties that are suitable for bonding with the resin.

According to an embodiment of the present disclosure, the nanopores having diameters of about 10 to about 100 nm may be formed, providing good connectivity with the resin. According to a further embodiment, by means of further corrosion, corrosion pores may be formed on the outer surface of the aluminum oxide layer, to be contacted with the resin. The corrosion pores may have larger diameters than the nanopores. According to an embodiment of the present disclosure, corrosion pores having diameters of about 200 nm to about 2000 nm may be formed on the outer surface, which contribute to enhance the connectivity of the resin with the aluminum alloy.

In the course of the subsequent molding step, the resin may penetrate into the pores in the inner layer through the relative bigger pores on the outer surface of aluminum alloy, which makes molding easier. According to embodiments of present disclosure, the aluminum alloy may be joined to the resin tightly without additional bindings, and a higher strength may be obtained. According to embodiments of present disclosure, there is little influence on the size of the metal substrate and the appearance of the aluminum alloy, and relatively less heat is produced in the course of processing. Meanwhile, the resin may be easily injection molded into the corrosion pores with larger diameters on the surface, and there is no particular requirement on the resin. The present technical solution may be used widely, is environment-friendly, and may be adopted for mass production.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Reference will be made in detail to embodiments of the present disclosure. The embodiments described herein are explanatory, illustrative, and used to generally understand the present disclosure. The embodiments shall not be construed to limit the present disclosure.

According to a first aspect of the present disclosure, a method of preparing an aluminum alloy-resin composite is provided. The method comprises:

S1: Anodizing a Surface of an Aluminum Alloy Substrate to Form an Oxide Layer on the Surface, in which the Oxide Layer is Formed with Nanopores.

According to embodiments of present disclosure, at this step, aluminum alloy substrate, optionally pre-treated prior to step S1, may be subjected to anodization treatment. Thus an oxide layer may be formed on the surface of the aluminum alloy substrate, and the oxide layer may be formed with nanopores. According to embodiments of the present disclosure, the method for the anodization treatment may be known to the skilled person in the art.

According to embodiments of the present disclosure, the step S1, namely the anodization treatment may comprise: providing an aluminum alloy substrate, optionally pre-treated prior to this step, as an anode in a $H_2SO_4$ solution with a concentration of about 10 wt % to about 30 wt %; and electrolyzing the aluminum alloy substrate at a temperature of about 10° C. to about 30° C. at a voltage of about 10V to about 100V for about 1 min to about 40 min to form the oxide layer with a thickness of about 1 µm to about 10 µm on the surface of the aluminum alloy substrate.

According to embodiments of present disclosure, any apparatus known for the anodization treatment may be applied in the present disclosure. For example according to an embodiment of the present disclosure, an anodization tank may be applied.

According to an embodiment of the present disclosure, the oxide layer formed by means of anodization treatment may have a thickness of about 1 µm to about 10 µm. According to a further embodiment, the oxide layer formed by means of anodization treatment may have a thickness of about 1 µm to about 5 µm.

According to an embodiment of the present disclosure, the nanopores of the oxide layer may have diameters of about 10 nm to about 100 nm. According to a further embodiment, the nanopores of the oxide layer may have diameters of about 20 nm to about 80 nm. According to a still further embodiment, the nanopores of the oxide layer may have diameters of about 20 nm to about 60 nm. According to an embodiment of the present disclosure, the nanopores may have a depth of about 0.5 µm to about 9.5 µm. According to a further embodiment, the nanopores of the oxide layer may have a depth of about 0.5 µm to about 5 µm. The nanopores provide improved connectivity force between the oxide layer and the resin.

S2: Immersing the Resulting Aluminum Alloy Substrate Generated at Step S1 in an Alkaline Solution Having a pH of about 10 to about 13, to Form Corrosion Pores in an Outer Surface of the Oxide Layer.

According to embodiments of the present disclosure, at this step, the resulting aluminum alloy substrate generated at step S1 may be immersed in an alkaline solution with a pH of about 10 to about 13. Thus, corrosion pores may be formed on the outer surface of the oxide layer formed on the aluminum alloy substrate at step S1. At this step, an alkaline solution with a pH of about 10 to about 13 is used to treat the resulting aluminum alloy substrate generated at step S1. Then, the corrosion pores may be formed on an outer surface of the oxide layer. The size of corrosion pores is usually larger than that of nanopores.

The type of the alkaline solution is not limited. According to embodiments of the present disclosure, the alkaline solution includes an aqueous solution comprising at least one selected from a soluble carbonates, a soluble alkali, a soluble phosphate, a soluble sulfate, and a soluble borate. According to further embodiments of the present disclosure, the alkaline solution is an aqueous solution including at least one selected from a group of $Na_2CO_3$, $NaHCO_3$, $NaOH$, $NaH_2PO_4$, $Na_2HPO_4$, $Na_3PO_4$, $Na_2SO_3$ and $Na_2B_4O_7$. According to still further embodiments of the present disclosure, the alkaline solution includes an aqueous solution comprising $Na_2CO_3$ and/or $NaHCO_3$.

According to some embodiments of the present disclosure, in the alkaline solution, $Na_2CO_3$ and/or $NaHCO_3$ have a mass percent concentration of about 0.1 wt %-15 wt % respectively. According to still further embodiments of the present disclosure, in the alkaline solution, $Na_2CO_3$ and/or $NaHCO_3$ have a mass percent concentration of about 0.1 wt %-10 wt % respectively.

According to embodiments of the present disclosure, corrosion pores with diameters of micrometer level are formed. According to embodiments of the present disclosure, the corrosion pores may have diameters of about 200 nm to about 2000 nm. According to further embodiments of the present disclosure, the corrosion pores may have diameters of about 200 nm to about 1000 nm. According to still further embodiments of the present disclosure, the corrosion pores may have diameters of about 400 nm to about 1000 nm. According to embodiments of the present disclosure, the corrosion pores may have a depth of about 0.5 µm to about 9.5 µm. According to still further embodiments of the present disclosure, the corrosion pores may have diameters of about 0.5 µm to 5 µm. The corrosion pores are communicated with the nanopores.

During subsequent molding (step S3 below), the resin will enter into the pores formed on the surface of aluminum alloy substrate in the course of injection molding, and thus the resin layer will be well joined with the aluminum alloy substrate. The corrosion pores are distributed evenly on the surface of the oxide layer with uniform diameters. The pore structure may enable a better connectivity performance between the resin layer and the aluminum alloy substrate, resulting in a better tensile strength and a better integral joining of the aluminum alloy-resin composite.

According to an embodiment of the present disclosure, step S2 further comprises repeatedly immersing the resulting aluminum alloy obtained at step S1 in the alkaline solution having a pH of about 10 to about 13 for a plurality of times. In one embodiment, the immersing is repeated for about 2-10 times, with each immersing lasting for about 1 minute to about 60 minutes. The aluminum alloy is cleaned with water after each immersing by, for example, washing with de-ionized water. According to an embodiment of the present disclosure, the cleaning may comprise placing the article to be cleaned in a washing tank and standing for about 1 minute to 5 minutes.

S3: Injection Molding a Resin onto the Surface of the Resulting Aluminum Alloy Substrate Obtained at Step S2 in a Mold to Obtain the Aluminum Alloy-Resin Composite.

According to embodiments of the present disclosure, at this step, the resulting aluminum alloy substrate after the treatments at steps S1 and S2 may be placed in a mold, and a resin composition may be injected into the mold to be combined with the aluminum alloy substrate, thus forming an aluminum alloy-resin composite after molding treatment.

As mentioned before, prior to the treatment at step S1, the aluminum alloy substrate may be subjected to a pretreatment on the surface. The pretreatment may include mechanical burnishing or mechanical lapping to remove visible foreign matters from the surface, and degreasing and washing the aluminum alloy substrate to remove processing oil adhered to the metal surface. The pretreatment may comprise, for example, burnishing the surface of the aluminum alloy substrate using a sand paper of about 100 mesh to about 400 mesh or using a polishing machine, to create small pores of microns.

According to embodiments of present disclosure, the burnished aluminum alloy substrate may be sequentially subjected to oil removing, a first washing with water, alkali etching, a second washing with water, neutralizing, and a third washing with water. According to embodiments of present disclosure, the aluminum alloy substrate may be cleaned by means of ultrasonic wave using a known solvent for about 0.5 hour to about 2 hours to remove oily dirty from the surface of the aluminum alloy substrate. The aluminum alloy substrate may be placed in an acid/alkali aqueous solution, and washed again under ultrasonic wave. The types of the solvents and acid/alkali aqueous solution are not limited, the solvent used may be ethanol or acetone, and the acid/alkali aqueous solution may be at least one selected from a group of hydrochloric acid, sulphuric acid, sodium hydroxide, potassium hydroxide and the like.

According to embodiments of the present disclosure, the aluminum alloy substrate is subjected to oil removing treatment using water-free ethanol to remove oil from the surface, and then washed using water. Then, the washed aluminum alloy substrate is immersed in a sodium hydroxide solution at a concentration of about 30-70 g/L and at a temperature of about 40° C. to about 80° C. to alkali etch the aluminum alloy substrate for about 1-5 min, and washed using deionized water. Then, the aluminum alloy substrate is neutralized using a 10~30 wt % $HNO_3$ to remove trace alkali solution, and washed using deionized water. Thus, a pore with a diameter of microns may be formed on the surface of the aluminum alloy substrate. According to embodiments of the present disclosure, the diameter of the pore may be about 1-10 μm.

There are no special limitations to the aluminum alloy used in the present disclosure. The aluminum alloy may be Industry-Standard 1000-7000 series, or various aluminum alloys suitable for molding. The aluminum alloy in this disclosure may be commonly-used aluminum alloy with various shapes and structures, which is not limited by the present disclosure. The various shapes and structures of the aluminum alloy may be achieved by mechanical processing.

There is no special limitation to the resin used in the present disclosure. The resin may include any resin, such as thermoplastic resin, capable of joining with aluminum alloy. According to embodiments of the present disclosure, the thermoplastic resin may include a mixture of a main resin and a polyolefin resin. According to embodiments of present disclosure, the main resin may include non-crystalline resin, which has a surface gloss and a toughness both superior to those of the highly crystalline resins in the prior art. The main resin is used as an injection molding material. A polyolefin resin with a melting point of about 65° C. to about 105° C. may also used. Therefore, injection molding at a specific mound temperature may not be required during the molding, subsequent annealing treatment may also not be required. The molding process may be simplified, it may be ensured that the obtained metal-resin composite may have high mechanical strength and good surface treatment characteristics, providing a wide range of surface decoration of a plastic article and meeting the diverse requirements of customers.

According to embodiments of the present disclosure, by using a polyolefin resin with a melting point of about 65° C. to about 105° C. in the non-crystalline main resin, the flowing capability of the resin in the nanopores on the surface of the metal sheet may be enhanced, thus ensuring strong adhesive force between the metal and the plastic as well as high mechanical strength of the metal-resin composite. Preferably, based on 100 weight parts of the thermoplastic resin, the amount of the main resin is about 70 weight parts to about 95 weight parts, and the amount of the polyolefin resin is about 5 weight parts to about 30 weight parts.

The flowing capability of the resin may be further enhanced by including a flow improver in the thermoplastic resin, thus further enhancing the adhesive force between the metal and the plastic as well as the injection molding performance of the resin. Preferably, based on 100 weight parts of the thermoplastic resin, the thermoplastic resin further includes about 1 weight part to about 5 weight parts of a flow improver. Preferably, the flow improver is a cyclic polycarbonate.

As mentioned before, the resin used in present disclosure may be a non-crystalline resin. According to embodiments of present disclosure, the main resin may include a mixture of polyphenylene ether (PPO) and polyphenylene sulfide (PPS). According to one embodiment of the present disclosure, in the main resin, the weight ratio of polyphenylene ether to polyphenylene sulfide is about 3:1 to about 1:3. According to a further embodiment of the present disclosure, in the main resin, the weight ratio of polyphenylene ether to polyphenylene sulfide is about 2:1 to about 1:1. According to embodiments of the present disclosure, the main resin includes a mixture of polyphenylene oxide and a polyamide. According to one embodiment of the present disclosure, in the main resin, the weight ratio of polyphenylene oxide to the polyamide is about 3:1 to about 1:3. According to a further embodiment of the present disclosure, in the main resin, the weight ratio of polyphenylene oxide to the polyamide is about 2:1 to about 1:1. According to embodiments of present disclosure, in the main resin, the main resin is a polycarbonate, which may be linear chain polycarbonate or branched polycarbonate.

According to embodiments of present disclosure, the polyolefin resin has a melting point of about 65° C. to about 105° C. The polyolefin resin may be grafted polyethylene. A grafted polyethylene with a melting point of about 100° C. to about 105° C. may be used as polyolefin resin.

The resin used in the present disclosure may further comprise other modifier additives, and there is no special limitation to the additives. For example, the resin may comprise a filler. And there is no special limitation to the filler, and the non-limiting example of the filler is fiber filler or powder inorganic filler. The fiber filler may be at least one selected from a group of fiberglass, carbon fiber and aromatic polyamide fiber. And the powder inorganic filler may be at least one selected from a group of calcium carbonate, magnesium carbonate, silica, heavy barium sulfate, talcum powder, glass and clay. According to embodiments of the present disclosure, based on 100 weight parts of the main resin, the content of the fiber filler is 50-150 weight parts and the content of the powder filler is 50-150 weight parts. The resin has a linear expansion coefficient similar to the aluminum alloy both in horizontal and vertical directions.

According to embodiments of the present disclosure, the resin used in present disclosure may be prepared by mixing the main resin and the polyolefin resin. For example, the resin is prepared by mixing evenly the main resin and the polyolefin resin, and then granulated with twin-screw extruding machine.

According to embodiments of the present disclosure, a flow improver and a filler may be added to the main resin and mixed evenly. Thus, the obtained resin has a linear expansion coefficient similar to the aluminum alloy both in horizontal and vertical directions.

According to embodiments of present disclosure, the conditions to carry out the injection molding are not limited. For example, according to one embodiment of the present disclosure, the condition of injection molding may be: mold temperature 50 to 200° C., nozzle temperature 200-350° C., the amount of injected resin composite being 0.1-1000 g, and the surface of the prepared composite having a resin layer with a depth of 0.1-10 mm.

The preparation method of the present disclosure is simple which simplifies significantly the production process when compared with existing adhesive technologies, shortens the production time, and significantly reduces the process complexity. All above may be achieved by directly injection molding after using the process method of the present disclosure. At the same time, the prepared aluminum alloy-resin composite of the present disclosure has an improved bonding between the resin layer and the aluminum alloy substrate, and has better tensile shear strength.

According to another aspect of present disclosure, an aluminum alloy-resin composite obtained by the method described here is provided. According to embodiments of the present disclosure, the aluminum alloy-resin composite comprises an aluminum alloy substrate and a resin layer, in which a resin forming the resin layer is filled in nanopores and corrosion pores. The resin may be a known resin that can be combined with the aluminum alloy.

In order to make the technical problem, the technical solution and the advantageous effects of the present disclosure more clear, the present disclosure will be further described below in detail with reference to examples thereof. It would be appreciated that particular examples described herein are merely used to understand the present disclosure. The examples shall not be construed to limit the present disclosure. The raw materials used in the examples and the comparative examples are all commercially available, without special limits.

Example 1

In this example, an aluminum alloy resin composite was prepared.

1. Pretreatment:

A commercially available A5052 aluminum alloy plate with a thickness of 1 mm was cut into 15 mm×80 mm rectangular sheets, which were then polished in a polishing machine, cleaned with water-free ethanol, and then immersed in a 40 g/L NaOH aqueous solution. After 2 minutes, the rectangular sheets were washed with water and dried to obtain pretreated aluminum alloy sheets.

2. Surface Treatment 1:

Each aluminum alloy sheet as an anode was placed in an anodizing bath including a 20 wt % $H_2SO_4$ solution. The aluminum alloy was electrolyzed at a voltage of 20V at 20° C. for 10 min, and then the aluminum alloy sheet was blow-dried.

Figure 2:
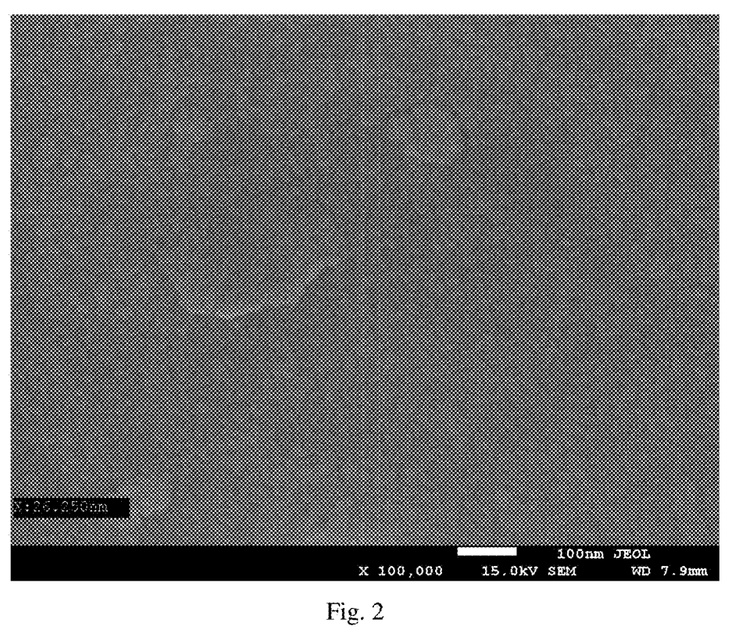
FIG. 2 shows a scanning electron microscopy diagram of the aluminum alloy sheet surface after surface treatment 1 in Example 1.

The cross section of the aluminum alloy sheet after the surface treatment 1 was observed by a metalloscope, showing that an aluminum oxide layer with a thickness of 5 µm was formed on the surface of the electrolyzed aluminum alloy sheet. The surface of the aluminum alloy sheet after the surface treatment 1 was observed by an electron microscope (see FIG. 2), showing that nanopores with diameters of about 40 nm to about 60 nm and depths of 1 µm was formed in the aluminum oxide layer.

3. Surface Treatment 2

100 ml aqueous solution including 10 wt % $Na_2CO_3$ (pH=12.2) was prepared in a beaker. The aluminum alloy sheet after step (2) was immersed in the sodium carbonate solution at 20° C., taken out after 5 min, and placed in a beaker including water to be immersed for 1 minute. After the process is repeated for 5 times, after water immersing for the last time, the aluminum alloy sheet was blow-dried.

Figure 1:
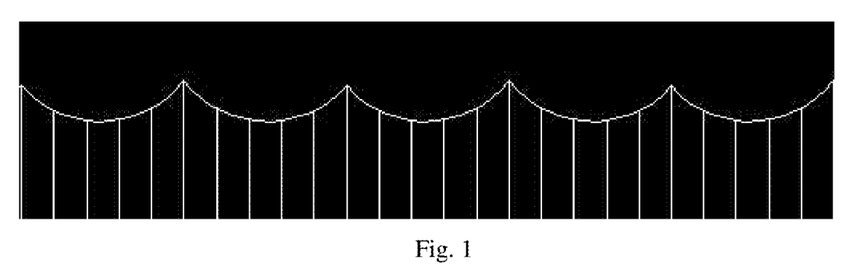
FIG. 1 shows the presence of two-layer spatial pore structure in the aluminum oxide layer prepared in one embodiment of the present disclosure.
Figure 3A:
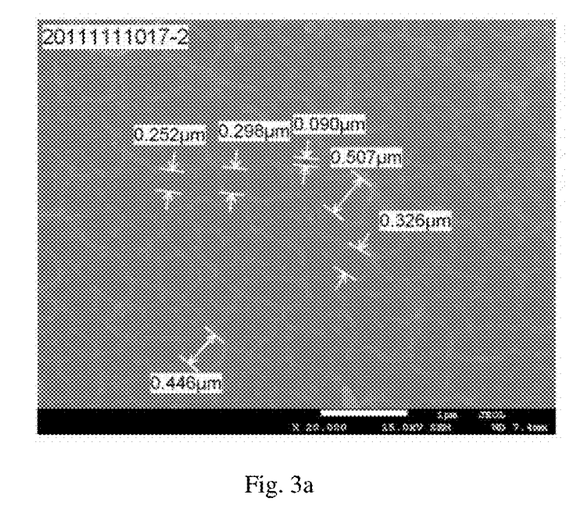
FIGS. 3a and 3b show scanning electron microscopy diagrams of the aluminum alloy sheet surface after surface treatment 2 in Example 1.
Figure 3B:
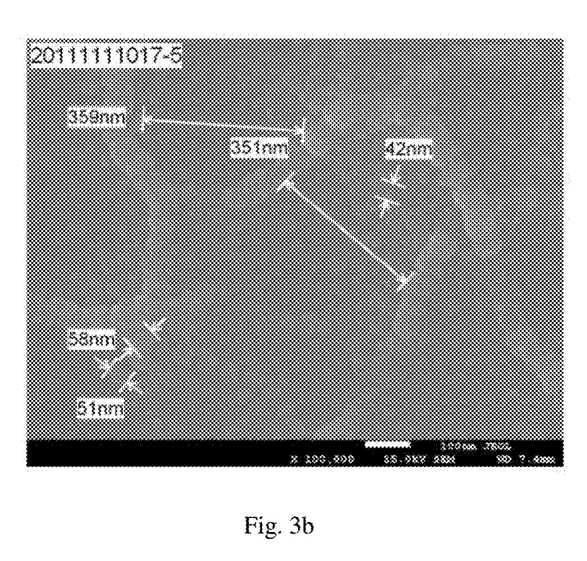

The surface of the aluminum alloy sheet after the surface treatment 2 was observed by an electron microscope (see FIGS. 3a and 3b), to find out that corrosion pores with diameters of 1000 nm to 1500 nm and depths of 4 µm was formed on the surface of the immersed aluminum alloy sheet. It may also be observed that there was a double-layer three-dimensional pore structure in the aluminum oxide layer similar to the structure shown in FIG. 1, and the corrosion pores were communicated with the nanopores.

4. Molding:

The dried aluminum alloy piece was inserted into an injection mold. A resin composition including a polyphenylene sulfide (PPS) resin and 30 wt % fiberglass is injection molded. The aluminum alloy resin composite which is a firmly combination of aluminum alloy and resin composite is obtained after being demolded and cooled.

Example 2

In this example, an aluminum alloy resin composite was prepared by a method which is substantially the same as the method in Example 1, with the following exceptions.

The alkaline solution used in the surface treatment 2 is a 100 ml aqueous solution including 15 wt % $Na_2CO_3$ with pH=12.5. It was observed that a layer of aluminum oxide film having a thickness of about 5 µm was formed after electrolysis, and nanopores having diameters of 40-60 nm were formed in the aluminum oxide layer. And it was observed that after surface treatment 2, corrosion pores with diameters of 1500-2000 nm and depths of 0.5 µm were formed on the surface of the immersed aluminum alloy sheet. It may also be observed that there was a double-layer three-dimensional pore structure in the aluminum oxide layer similar to the structure shown in FIG. 1, and the corrosion pores were communicated with the nanopores. And an aluminum alloy resin composite was prepared.

Example 3

In this example, an aluminum alloy resin composite was prepared by a method which is substantially the same as the method in Example 1, with the following exceptions.

The alkaline solution used in the surface treatment 2 is a 100 ml aqueous solution including 12 wt % $Na_2CO_3$ with pH=12.3. It was observed that a layer of aluminum oxide film having a thickness of about 5 μm was formed after electrolysis, and nanopores having diameters of 40-60 nm and depths of 1 μm were formed in the aluminum oxide layer. And it was observed that after surface treatment 2, corrosion pores with diameters of 1200-1800 nm and depths of 4 μm were formed in the surface of the immersed aluminum alloy sheet. It may also be observed that there was a double-layer three-dimensional pore structure in the aluminum oxide layer similar to the structure shown in FIG. 1, and the corrosion pores were communicated with the nanopores. And an aluminum alloy resin composite was prepared.

Example 4

In this example, an aluminum alloy resin composite was prepared by a method which is substantially the same as the method in Example 1, with the following exceptions.

The alkaline solution used in the surface treatment 2 is a 100 ml aqueous solution including 8 wt % $Na_2CO_3$ with pH=11.9. It was observed that a layer of aluminum oxide film having a thickness of about 5 μm was formed after electrolysis, and nanopores having diameters of 40-60 nm and depths of 1 μm were formed in the aluminum oxide layer. And it was observed that after surface treatment 2, corrosion pores with diameters of 600-1000 nm and depths of 4 μm were formed on the surface of the immersed aluminum alloy sheet. It may also be observed that there was a double-layer three-dimensional pore structure in the aluminum oxide layer similar to the structure shown in FIG. 1, and the corrosion pores were communicated with the nanopores. And an aluminum alloy resin composite was prepared.

Example 5

In this example, an aluminum alloy resin composite was prepared by a method which is substantially the same as the method in Example 1, with the following exceptions.

The alkaline solution used in the surface treatment 2 is a 100 ml aqueous solution including 6 wt % $Na_2CO_3$ with pH=11.7. It was observed that a layer of aluminum oxide film having a thickness of about 5 μm was formed after electrolysis, and nanopores having diameters of 40-60 nm and depths of 2 μm were formed in the aluminum oxide layer. And it was observed that after surface treatment 2, corrosion pores with diameters of 600-1000 nm and depths of 3 μm were formed in the surface of the immersed aluminum alloy sheet. It may also be observed that there was a double-layer three-dimensional pore structure in the aluminum oxide layer similar to the structure shown in FIG. 1, and the corrosion pores were communicated with the nanopores. And an aluminum alloy resin composite was prepared.

Example 6

In this example, an aluminum alloy resin composite was prepared by a method which is substantially the same as the method in Example 1, with the following exceptions.

The alkaline solution used in the surface treatment 2 is a 100 ml aqueous solution including 15 wt % $NaHCO_3$ with pH=11.5. It was observed that a layer of aluminum oxide film having a thickness of about 5 μm was formed after electrolysis, and nanopores having diameters of 40-60 nm and depths of 2 μm were formed in the aluminum oxide layer. And it was observed that after surface treatment 2, corrosion pores with diameters of 300-1000 nm and depths of 3 μm were formed in the surface of the immersed aluminum alloy sheet. It may also be observed that there was a double-layer three-dimensional pore structure in the aluminum oxide layer similar to the structure shown in FIG. 1, and the corrosion pores were communicated with the nanopores. And an aluminum alloy resin composite was prepared.

Example 7

In this example, an aluminum alloy resin composite was prepared by a method which is substantially the same as the method in Example 1, with the following exceptions.

The alkaline solution used in the surface treatment 2 is a 100 ml aqueous solution including 1 wt % NaOH with pH=12. It was observed that a layer of aluminum oxide film having a thickness of about 5 μm was formed after electrolysis, and nanopores having diameters of 40-60 nm and depths of 1 μm were formed in the aluminum oxide layer. And it was observed that after surface treatment 2, corrosion pores with diameters of 800-1500 nm and depths of 4 μm were formed in the surface of the immersed aluminum alloy sheet. It may also be observed that there was a double-layer three-dimensional pore structure in the aluminum oxide layer similar to the structure shown in FIG. 1, and the corrosion pores were communicated with the nanopores. And an aluminum alloy resin composite was prepared.

Comparative Example 1

1. Pretreatment:

A commercially available A5052 aluminum alloy plate with a thickness of 1 mm was cut into 15 mm×80 mm rectangular sheets, which were then polished in a polishing machine, cleaned with water-free ethanol, and then immersed in a 2 wt % NaOH aqueous solution. After 2 minutes, the rectangular sheets were washed with water and dried to obtain pretreated aluminum alloy sheets.

2. Surface-Treatment:

Each aluminum alloy sheet was immersed into a hydrazine hydrate aqueous solution having a concentration of 5 wt % with pH=11.2. After 2 min at 50° C., the aluminum alloy sheet was taken out and washed with deionized water. After the process was repeated for 30 times, the aluminum alloy sheet was taken out and dried in a drying oven at 60° C.

3. Molding:

The dried aluminum alloy piece was inserted into an injection mold. A resin composition including a polyphenylene sulfide (PPS) resin and 30 wt % fiberglass was injection molded. The aluminum alloy resin composite including bonding between the aluminum alloy and the resin composite was obtained after being demolded and cooled.

Comparative Example 2

1. Pretreatment:

A commercially available A5052 aluminum alloy plate with a thickness of 1 mm was cut into 15 mm×80 mm rectangular sheets, which were then polished in a polishing machine, and cleaned with water-free ethanol, and then immersed in a 2 wt % NaOH aqueous solution. After 2 minutes, the rectangular sheets were washed with water and dried to obtain pretreated aluminum alloy sheets.

2. Surface-Treatment:

Each aluminum alloy sheet as an anode was placed in an anodizing bath including a 20 wt % $H_2SO_4$ solution, the aluminum alloy was electrolyzed at a voltage of 15V for 5 min, and then the aluminum alloy sheet was blow-dried.

3. Molding:

The dried aluminum alloy piece was inserted into an injection mold. A resin composition including a polyphenylene sulfide (PPS) resin and 30 wt % fiberglass is injection molded. The aluminum alloy resin composite which was a firmly combination of aluminum alloy and resin composite was obtained after being demolded and cooled.

Performance Test

The connectivity of the aluminum alloy and the resin: the aluminum alloy resin composites prepared in examples 1-7 and comparative examples 1-2 were fixed in a universal material testing machine to perform tensile test. The test results under maximum load can be regarded as the connectivity force value between the aluminum alloy and resin, the test results were summarized in Table 1.

TABLE 1

|  | Thickness of oxide film layer/μm | Diameters of nanopore/ nm | Depth of nanopore/ μm | Diameters of corrosion pore/ nm | Depth of Nano Pore/ μm | Combination/N |
| --- | --- | --- | --- | --- | --- | --- |
| Example 1 | 5 | 40-60 | 1 | 1000-1500 | 4 | 1255 |
| Example 2 | 5 | 40-60 | 0.5 | 1500-2000 | 4.5 | 1221 |
| Example 3 | 5 | 40-60 | 1 | 1200-1800 | 4 | 1209 |
| Example 4 | 5 | 40-60 | 1 | 600-1000 | 4 | 1245 |
| Example 5 | 5 | 40-60 | 2 | 600-1000 | 3 | 1223 |
| Example 6 | 5 | 40-60 | 2 | 300-1000 | 3 | 1251 |
| Example 7 | 5 | 40-60 | 1 | 800-1500 | 4 | 1267 |
| Comparative example 1 |  | 20-100 |  |  |  | 357 |
| Comparative example 2 |  | 40-60 |  |  |  | 65 |

It can be seen from Table 1 that the bonding between the resin and the aluminum alloy in the aluminum alloy resin composite of the present disclosure can achieve up to 1211 N. While the bonding between the resin and the aluminum alloy in existing aluminum alloy resin composites is tens or hundreds of newton. The performance of the aluminum alloy resin composite in the present disclosure has been improved significantly to improve the resin molding. The aluminum alloy in the present disclosure does not need additional bonding to be combined with the resin. The method disclosed here has little effect on size of the metal substrate and appearance of the aluminum alloy. At the same time, it is easier to inject mold resin directly into the corrosion holes with a bigger surface. It also has no specific requirement for the resin, so the application is wider. And there is no environmental pollution which is more suitable for mass production.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method of preparing an aluminum alloy-resin composite, comprising the steps of:
    S1: anodizing a surface of an aluminum alloy substrate to form an oxide layer on the surface, wherein the oxide layer is formed with nanopores;
    S2: immersing the resulting aluminum alloy substrate obtained at step S1 in an alkaline solution having a pH of about 10 to about 13, to form corrosion pores on an outer surface of the oxide layer, wherein the corrosion pores have a larger diameter than the nanopores, the corrosion pores and the nanopores form a double-layer pore structure, and the corrosion pores are in communication with the nanopores, wherein the alkaline solution includes an aqueous solution comprising at least one selected from a soluble carbonates, a soluble alkali, a soluble phosphate, a soluble sulfate, and a soluble borate; and
    S3: injection molding a resin onto the surface of the resulting aluminum alloy substrate obtained at step S2 in a mold to obtain the aluminum alloy-resin composite.

2. The method according to claim 1, wherein the alkaline solution includes an aqueous solution comprising at least one selected from a group of $Na_2CO_3$, $NaHCO_3$, $NaOH$, $NaH_2PO_4$, $Na_2HPO_4$, $Na_3PO_4$, $Na_2SO_3$, and $Na_2B_4O_7$.

3. The method according to claim 1, wherein the alkaline solution includes at least one of $Na_2CO_3$ and $NaHCO_3$.

4. The method according to claim 3, wherein, in the alkaline solution, the at least one of $Na_2CO_3$ and $NaHCO_3$ has a concentration of about 0.1 wt %-15 wt %.

5. The method according to claim 1, wherein the step S2 comprises:
    repeatedly immersing the resulting aluminum alloy obtained at step S1 in the alkaline solution for more than one time, wherein each immersing lasts for about 1 minute to about 60 minutes; and
    cleaning the aluminum alloy with water after each immersing.

6. The method according to claim 5, wherein the step S2 comprises repeatedly immersing the resulting aluminum alloy obtained in step S1 in the alkaline solution for about 2-10 times.

7. The method according to claim 1, wherein the nanopores have an average diameter of about 10 nm to about 100 nm, the corrosion pores have an average diameter of about 200 nm to about 2000 nm, and the oxide layer has a thickness of about 1 μm to about 5 μm.

8. The method according to claim 1, wherein anodizing the surface of the aluminum alloy substrate comprises:
    providing the aluminum alloy substrate as an anode in a $H_2SO_4$ solution with a concentration of about 10 wt % to about 30 wt %; and
    electrolyzing the aluminum alloy substrate at a temperature of about 10° C. to about 30° C. at a voltage of about 10V to about 100V for about 1 minute to about 40 minutes to form the oxide layer with a thickness of about 1 μm to about 10 μm on the surface of the aluminum alloy substrate.

9. The method according to claim 1, further comprising applying a pretreatment to the aluminum alloy substrate, wherein the pretreatment includes: oil removal, a first washing with water, alkali etching, a second washing with water, neutralizing, and a third washing with water.

10. The method according to claim 1, wherein the resin is a thermoplastic resin.

11. The method according to claim 10, wherein the thermoplastic resin includes a main resin and a polyolefin resin.

12. The method according to claim 11, wherein the main resin includes polyphenylene ether and polyphenylene sulfide, and the polyolefin resin has a melting point of about 65° C. to about 105° C.

13. The method according to claim 12, wherein, in the main resin, the weight ratio of the polyphenylene ether to the polyphenylene sulfide is about 3:1 to about 1:3.

14. The method according to claim 11, wherein the main resin includes a polyphenylene oxide and a polyamide, and the polyolefin resin has a melting point of about 65° C. to about 105° C.

15. The method according to claim 14, wherein, in the main resin, the weight ratio of the polyphenylene oxide to the polyamide is about 3:1 to about 1:3.

16. The method according to claim 11, wherein the main resin includes polycarbonate, and the polyolefin resin has a melting point of about 65° C. to about 105° C.

17. The method according to claim 11, wherein, based on 100 weight parts of the thermoplastic resin, the main resin is about 70 weight parts to about 95 weight parts, and the polyolefin resin is about 5 weight parts to about 30 weight parts.

18. The method according to claim 11, wherein the polyolefin resin includes a grafted polyethylene.

19. The method according to claim 10, wherein based on 100 weight parts of the thermoplastic resin, the thermoplastic resin further includes a flow improver with about 1 weight part to about 5 weight parts; and wherein the flow improver includes a cyclic polyester.

20. The method according to claim 10, wherein the resin further includes a filler, and the filler comprises at least one of a fiber filler and a powder inorganic filler; and wherein, the fiber filler includes at least one selected from a group of fiberglass, carbon fiber and polyamide fiber; and the powder inorganic filler includes at least one selected from a group of silica, talc, aluminum hydroxide, magnesium hydroxide, calcium carbonate, magnesium carbonate, glass and kaolin.

* * * * *